United States Patent
Kravitz et al.

(10) Patent No.: US 12,271,737 B2
(45) Date of Patent: Apr. 8, 2025

(54) PAIR MERGE EXECUTION UNITS FOR MICROINSTRUCTIONS

(71) Applicant: Cavium LLC, Santa Clara, CA (US)

(72) Inventors: David Kravitz, Cambridge, MA (US); David A. Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 94 days.

(21) Appl. No.: 16/264,458

(22) Filed: Jan. 31, 2019

(65) Prior Publication Data

US 2020/0249955 A1 Aug. 6, 2020

(51) Int. Cl.
- *G06F 9/38* (2018.01)
- *G06F 7/76* (2006.01)
- *G06F 9/22* (2006.01)
- *G06F 9/30* (2018.01)

(52) U.S. Cl.
CPC ............ *G06F 9/3887* (2013.01); *G06F 7/762* (2013.01); *G06F 9/226* (2013.01); *G06F 9/30032* (2013.01); *G06F 9/30036* (2013.01); *G06F 9/30196* (2013.01)

(58) Field of Classification Search
CPC ............... G06F 9/30036; G06F 9/3004; G06F 9/30032; G06F 9/3887; G06F 9/226; G06F 9/30038; G06F 9/38873; G06F 9/38875; G06F 9/3888; G06F 9/38885; G06F 9/30181

See application file for complete search history.

(56) References Cited

U.S. PATENT DOCUMENTS

| | | | | |
|---|---|---|---|---|
| 4,293,907 A * | 10/1981 | Huang | ............... | G06F 9/30189 712/208 |
| 5,684,983 A * | 11/1997 | Ando | ............... | G06F 9/30032 712/225 |
| 7,933,405 B2 * | 4/2011 | Knowles | ............ | G06F 9/30032 380/37 |
| 2015/0082009 A1 * | 3/2015 | Gschwind | .......... | G06F 9/30036 712/213 |
| 2016/0188530 A1 * | 6/2016 | San Adrian | ........ | G06F 16/9017 712/7 |

OTHER PUBLICATIONS

"Complex instruction set computer" <https://en.wikipedia.org/w/index.php?title=Complex_instruction_set_computer&oldid=865898866> (Year: 2018).*

* cited by examiner

*Primary Examiner* — Andrew Caldwell
*Assistant Examiner* — Kasim Alli (57) ABSTRACT

An instruction execution circuit operable to reduce two or more micro-operations into one by producing multiple permutation and merge results in one execution cycle. The execution circuit includes a permutation and merge switching fabric and a bank of multiplexers. For a fetched instruction, a decoder decodes an opcode to generate a set of control indications used to control the multiplexers to select bytes from the respective inputs that are destined for each of the multiple results. In this manner, multiple permutation results can be output from the execution circuits in one micro-operation.

24 Claims, 5 Drawing Sheets

PAIR MERGE EXECUTION UNITS FOR MICROINSTRUCTIONS

TECHNICAL FIELD

Embodiments of the present invention are related to the field of microprocessors, and in particular, to instruction decoding and execution mechanisms in microprocessors.

BACKGROUND OF THE INVENTION

Instruction set architectures defined for various processors commonly include instructions (or microinstructions) involving rearranging or permuting data elements from one or more inputs and produce a permutation and merge result. For example, such instructions can be used to load or store data elements from one or more source locations into elements of a destination location. In many processing system and applications, such instructions are repeatedly used especially in large volume data processing. Thus, it is desirable to reduce latency and power consumption associated with executing these instructions.

SUMMARY OF THE INVENTION

Embodiments of the present disclosure are directed to instruction (or microinstruction) execution circuits capable of executing instructions involving data element permutation and merge with reduced latency and reduced power consumption.

Embodiments of the present disclosure include a pair merge microinstruction execution circuit in a processor operable to perform permutation and merge operations on two inputs and provide two or more distinctive permutation and merge results in one execution cycle. In some embodiments, once an instruction is fetched, the decoder decodes the opcode to generate a set of control indications as well as a decoded opcode for supply to the execution circuit which is also fed with the two data inputs. The execution circuit includes a permutation switching fabric and a bank of multiplexers and is configured to permute selected data bytes (or any other data unit) from the two input operands and output two permutation results by the control of the control indications. Particularly, the control indications can be used to control the multiplexers to (1) select bytes from the two inputs that are destined for the first result; (2) select bytes from the two inputs that are destined for the second result; and (3) select which bytes of the results are fed from the first input, the second input, or a zero value.

In some embodiments, the two inputs are two source operands required by the opcode (e.g., the ARM™ load and store instructions, LD2 and ST2). In some other embodiments, the two inputs are two data sections (upper bytes and lower bytes) of a single operand as required by the opcode, e.g., floating point vector instructions. In some embodiments, the instruction is designed to be used in pairs, e.g., certain single-instruction-multiple-data (SIMD) permute instructions. In these cases, the pair merge instruction execution circuit can perform execution on the two inputs once and output two distinct results in the single execution cycle, effectively reducing two execution cycles to one and doubles the performance of instruction execution. Comparing with a conventional execution circuit which needs two execution cycles to obtain two distinctive permutation results, an instruction execution circuit according to embodiments of the present disclosure can significantly reduce latency and power consumption associated therewith.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Pair Merge Execution Units for Microinstructions

Embodiments of the present disclosure provide a mechanism of executing microinstructions involving data element permutation and merge, which allows two or more distinctive permutation and merge results to be output in a single execution cycle. For brevity, "microinstruction" may also be referred as "instruction" herein. In effect, two or more execution cycles are combined into one. Such an execution circuit may be referred to as a "pair merge execution circuit" herein. However it will be appreciated that the present disclosure is not limited to combination of any specific number of execution cycles; nor is it limited to any specific number of permutation and merge outputs that can be produced in one execution cycle. In some embodiments, when a fetched instruction is decoded, a set of control indications are generated to enable multiple outputs in a single execution cycle. Particularly, the permutation and merge circuitry in conjunction with a selector in the instruction execution circuit permutes and merges data elements of one or more inputs according to the opcode, where the respective data elements destined for each of the multiple permute outputs are selected by the control indications.

As defined in the corresponding instruction set architecture, certain micro-operations involve rearranging data elements from one or more input operands registers and output to two destination registers. For examples, in ARM™ instructions, the instruction LD2 specifies loading and rearranging multiple 2-element structures to two registers, and the instruction ST2 specifies rearranging and storing multiple 2-element structures from two registers.

In the conventional execution circuits configured for LD2 or ST2, two micro-operations are executed to obtain two permutation and merge results (or "permutation results" herein), one for each operand output. Particularly, two source operands are input to the circuit and selected data bytes of the operands are permuted to output one result. For instance, the two source operands are represented by "AB" and "CD" (each letter represents a byte) respectively, and input to the execution circuit which performs permutation and merge to output a single permutation result, e.g., "AC." To obtain another permutation result, the execution circuit needs to perform permutation on the two source operands again, e.g., to output "BD." However, it will be appreciated that this discussion is merely exemplary; and permutation and merge can be performed in any data unit or data element (e.g., bit or byte) without departing from the scope of the present disclosure.

Figure 1:
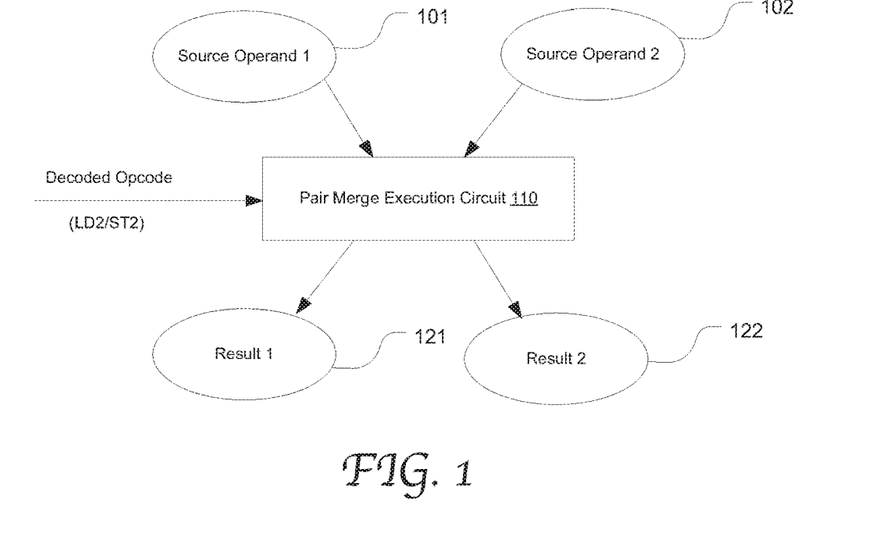
FIG. 1 illustrates the flow of operands in execution of an instruction by using an exemplary pair merge execution circuit in accordance with an embodiment of the present disclosure.

According to embodiments of the present disclosure, a pair merge execution circuit can perform permutation and merge on the two source operands "AB" and "CD," and output both "AC" and "BD" at the same time. FIG. 1 illustrates the flow of operands in execution of an instruction by using an exemplary pair merge execution circuit 110 in accordance with an embodiment of the present disclosure. The pair merge execution circuit 110 may be configured to execute LD2, ST2 or another instruction that involves permutation and merge. As illustrated, the source operands 1 and 2 (stored in the registers 101 and 102) as well as the decoded opcode are input to the pair merge execution circuit 110, two results are generated in one execution cycle and stored to the output registers 121 and 122 at the same time. Thus, two distinctive permutation results can be achieved in a single micro-operation. As a result, the pair merge execution unit requires only half the number of micro-operations that a single output merge unit would achieve. Thereby, the latency and power consumption can be significantly and advantageously reduced.

Some instructions require one source operand as defined by the instruction set architecture, and yet implementation concerns cause separation of the source operand data path. For example, a 128-bit floating point unit vector data path is split into an upper data path and a lower data path, e.g., for the upper 64 bits (the upper bytes) and lower 64 bits (the lower bytes). The upper bytes and the lower bytes are supplied as two inputs to the pair merge execution circuit. To name a few examples, such an instruction may be floating point add pairwise (FADDP), floating-point minimum of pair of elements (FMINP), floating-point maximum of pair of elements (FMAXP), or floating-point convert to higher precision long (FCVTL or FCVTN) instruction. The pair merge execution circuit for such an instruction can operate to rearrange the inputs and permute the segregated operations, or conversely, rearrange the output results of the segregated operations into the architecturally correct results.

Figure 2:
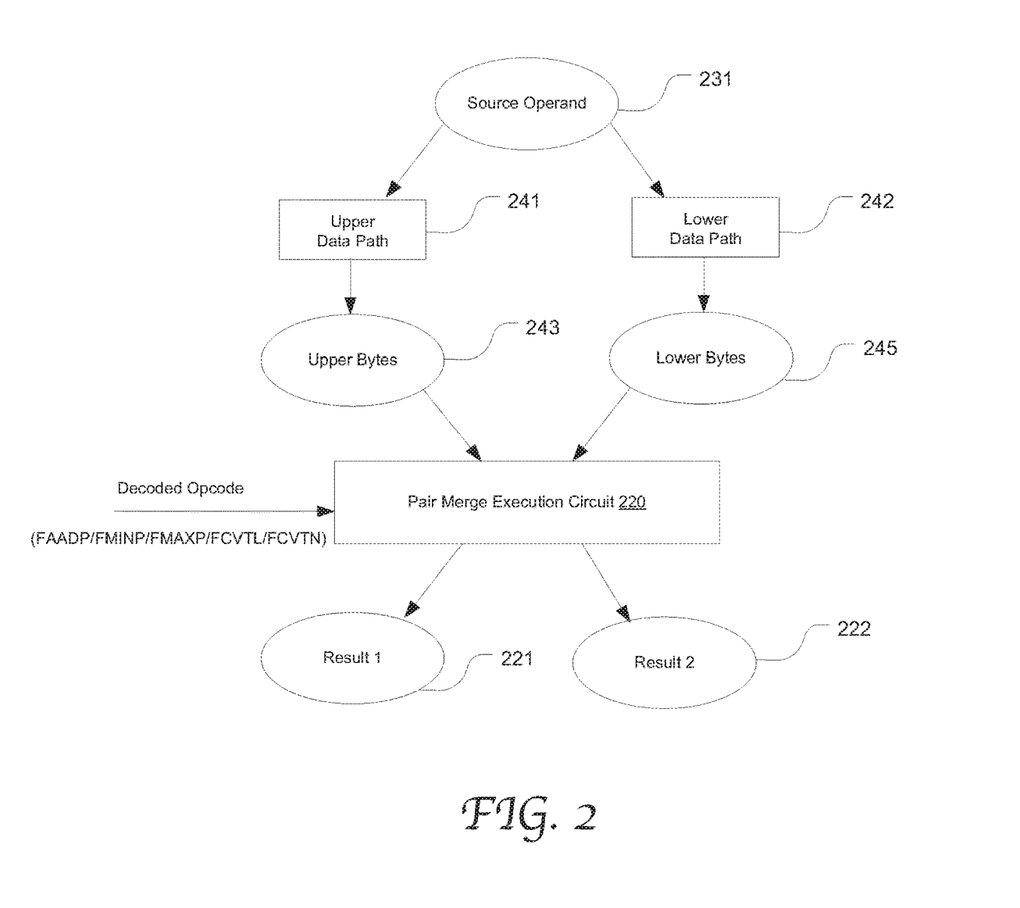
FIG. 2 illustrates the flow of operands in execution of an instruction which as architecturally defined requires a single source operand by using an exemplary pair merge execution circuit in accordance with an embodiment of the present disclosure.

FIG. 2 illustrates the flow of operands in execution of an instruction which as architecturally defined requires a single source operand by using an exemplary pair merge execution circuit 220 in accordance with an embodiment of the present disclosure. The instruction requires one source operand (stored in register 231) which is divided into upper bytes and lower bytes (store in the registers 201 and 202). The execution circuit 220 receives the two inputs through the upper data path 241 and the lower data path 242, respectively. Based on the decoded opcode, the pair merge execution circuit 220 performs permutation and merge on the two inputs and writes two different permutation results to the registers 221 and 223 at the same time.

Certain ARM™ SIMD permute instructions are defined to take two input operands and write to one destination register, but they are designed to be used in pairs so as to produce two results. In a conventional execution circuit for such an instruction, the first micro-operation takes the two input operands and writes to a destination register, and then the circuit takes the same two input operands and writes to a different destination register. To name a few examples, such an instruction may be zip (ZIP), unzip (UZP) or transpose (TRN) instructions. For example, the ZIP instructions ZIP1 and ZIP2 are paired and designed to be executed in sequence, each (ZIP1 or ZIP2) taking the same two source operands and producing one permutation and merge result in one execution cycle.

Figure 3:
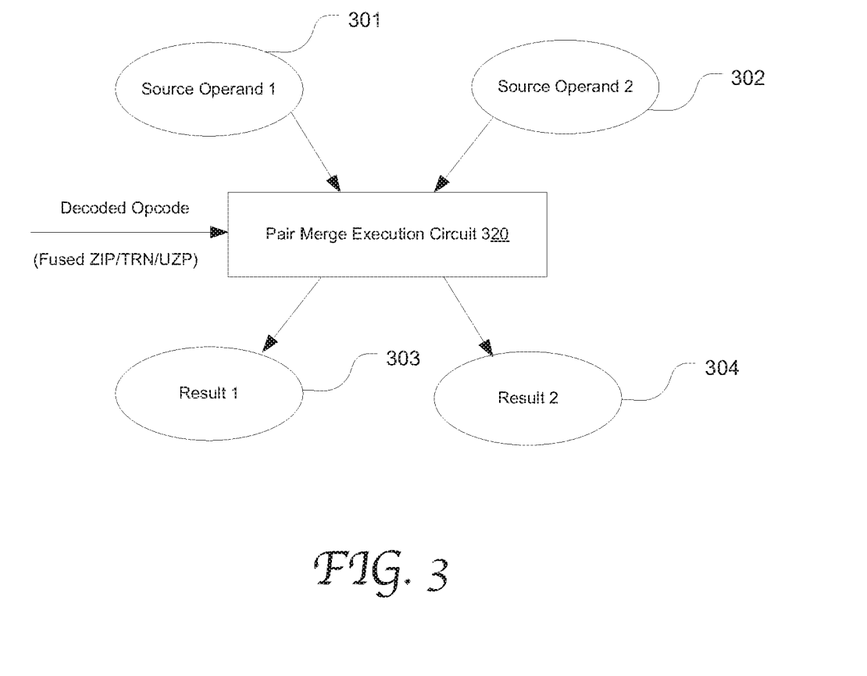
FIG. 3 illustrates the flow of operands in execution of an instruction which fuses two instructions by using an exemplary pair merge execution circuit in accordance with an embodiment of the present disclosure.

According to embodiments of the present disclosure, two micro-operations of executing a permute and merge instruction can be fused into one to reduce the execution latency. FIG. 3 illustrates the flow of operands in execution of an instruction which fuses two instructions by using an exemplary pair merge execution circuit 310 in accordance with an embodiment of the present disclosure. The two source operands are read from the registers 301 and 302 and fed to the pair merge execution circuit 310. The execution circuit 310 performs permutation and merge on the two inputs based on the decoded opcode and writes two different permutation results to the registers 303 and 304 at the same time.

The instructions and instruction set architectures named herein are merely exemplary and present disclosure is not limited thereto. For example, the execution circuits for SIMD across-vector instructions, ALU pair instructions, and narrowing/widening/lengthening instructions may also be implemented with the functionalities of providing multiple permutation and merge results simultaneously or in one execution cycle.

Figure 4:
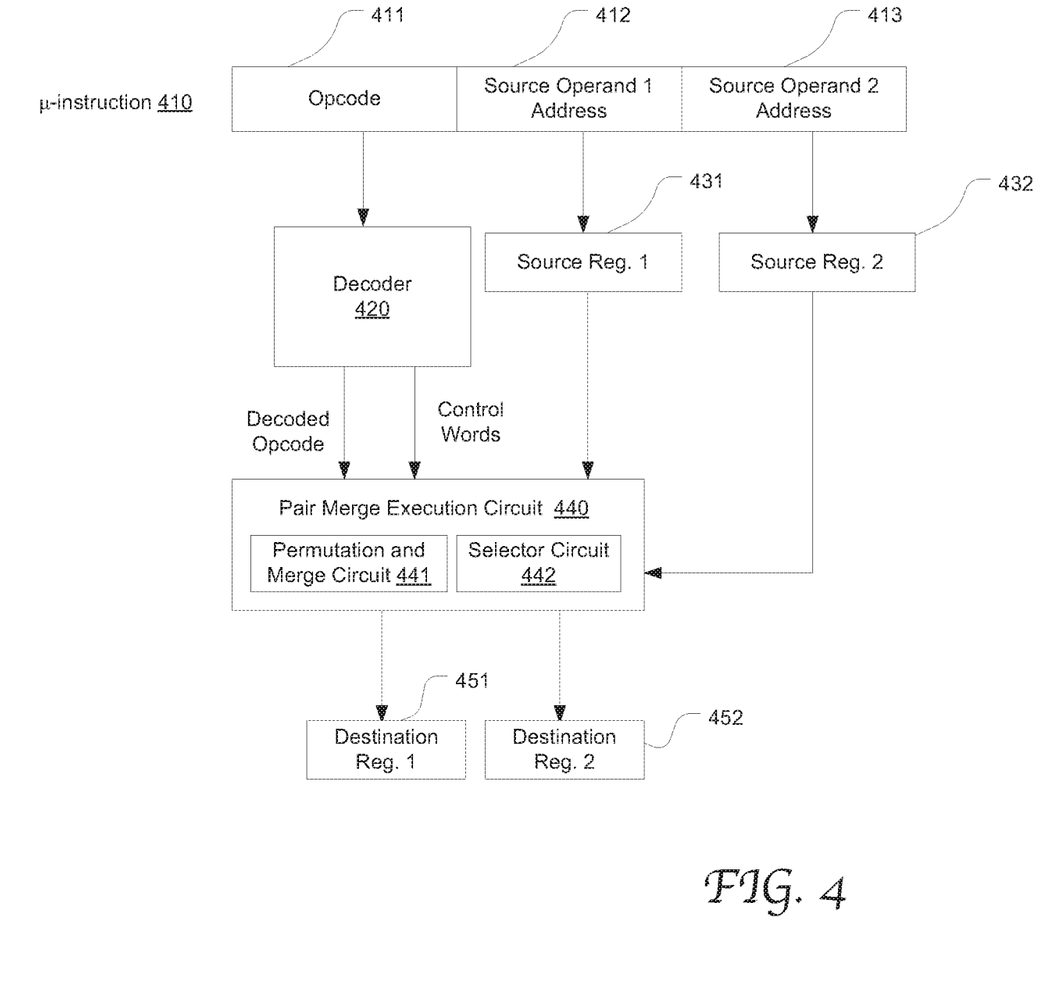
FIG. 4 illustrates the components in a microprocessor configured to execute an instruction by using an exemplary pair merge execution unit in accordance with an embodiment of the present disclosure.

FIG. 4 illustrates the components in a microprocessor configured to execute an instruction by using an exemplary pair merge execution unit in accordance with an embodiment of the present disclosure. An instruction 410 that involve permutation and merge of data elements of the input operands can be executed by the pair merge execution circuit 440 to produced two distinctive permutation results at the same time. Particularly, the instruction 410 is fetched from memory into the processor, which includes the opcode 411 and source operand addresses 412 and 413. The input operands are read from the input registers 431 and 432 and fed to the execution circuit 440.

The decoder 420 decodes the opcode 411 to generate a decoded opcode and a set of control words used to enable provision of multiple results in one execution cycle for supply to the execution circuit 440. The execution circuit 440 includes a permutation and merge circuit 441 and a selector circuit 442 and configured to permute selected data elements (e.g., data bytes) from the two inputs and simultaneously produce two permutation results. In some embodiments, the permutation and merge circuit 441 may be implemented by using a switching fabric or cross-bar, and the selector circuit 442 may be implemented by using multiplexers with corresponding control logic. The results can be written to the destination registers 451 and 452. The controls words control the pair merge circuit 442 that rearranges the data elements from the two inputs into the desired arrangement for the two results. The decoding from the instruction 410 to the control words may be a function of the opcode, the size of the vector elements (e.g., 8-bit, 16-bit, 32-bit or 64-bit), and the lengths of the input operands and the results.

Figure 5:
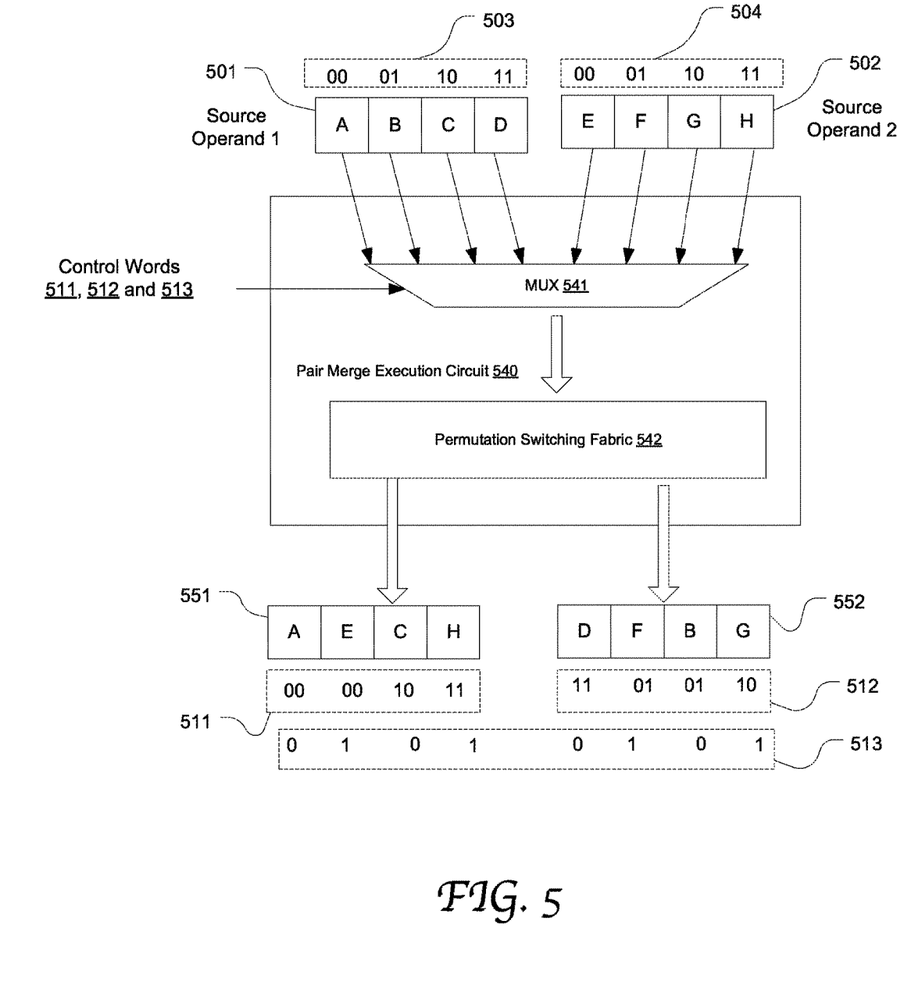
FIG. 5 illustrates the configuration of an exemplary pair merge execution circuit configured to execute an instruction and output multiple permutation results in accordance with an embodiment of the present disclosure.

FIG. 5 illustrates the configuration of an exemplary pair merge execution circuit 540 configured to execute an instruction and output multiple permutation and merge results in accordance with an embodiment of the present disclosure. In the illustrated example, the two input operands 501 and 502 are ABCD and EFGH, where each letter represents a data element. Each element position in an operand is associated with a control value (control values 503 and 504). For example, the most significant position is associated with a value of 00 and the least significant position is associated with 11.

The execution circuit is designed to execute various opcodes that involve permutation and merge and includes a bank of multiplexers 541 and a permutation switching fabric 542. In this embodiment, the set of control words from the decoder may include 5 control words. One pair of control words selects the data elements from the two inputs that are destined for the first result (result 1 551); one pair of control words selects data elements from the two inputs that are destined for the second result (result 2 552); and the remaining control word selects which data elements of the results 551 and 552 are fed from the first input 501, the second input 502 or a zero value. In this example, the control words 511 have the value of 00001011, the control words 512 have the value of 11010110, and the control word 513 has the value of 01010101 with "0" representing the first input and "1" representing the second input. Thus, the five control words in combination determine the two results being AECH and DFBG respectively.

However, this discussion is merely exemplary; any other definition of control indications can be used to enable multiple results outputs without departing from the scope of the present disclosure. Further, it will be appreciated that the present disclosure is not limited to any specific configurations, structures, components and methods used to implement the decoding and pair merge mechanisms.

Figure 6:
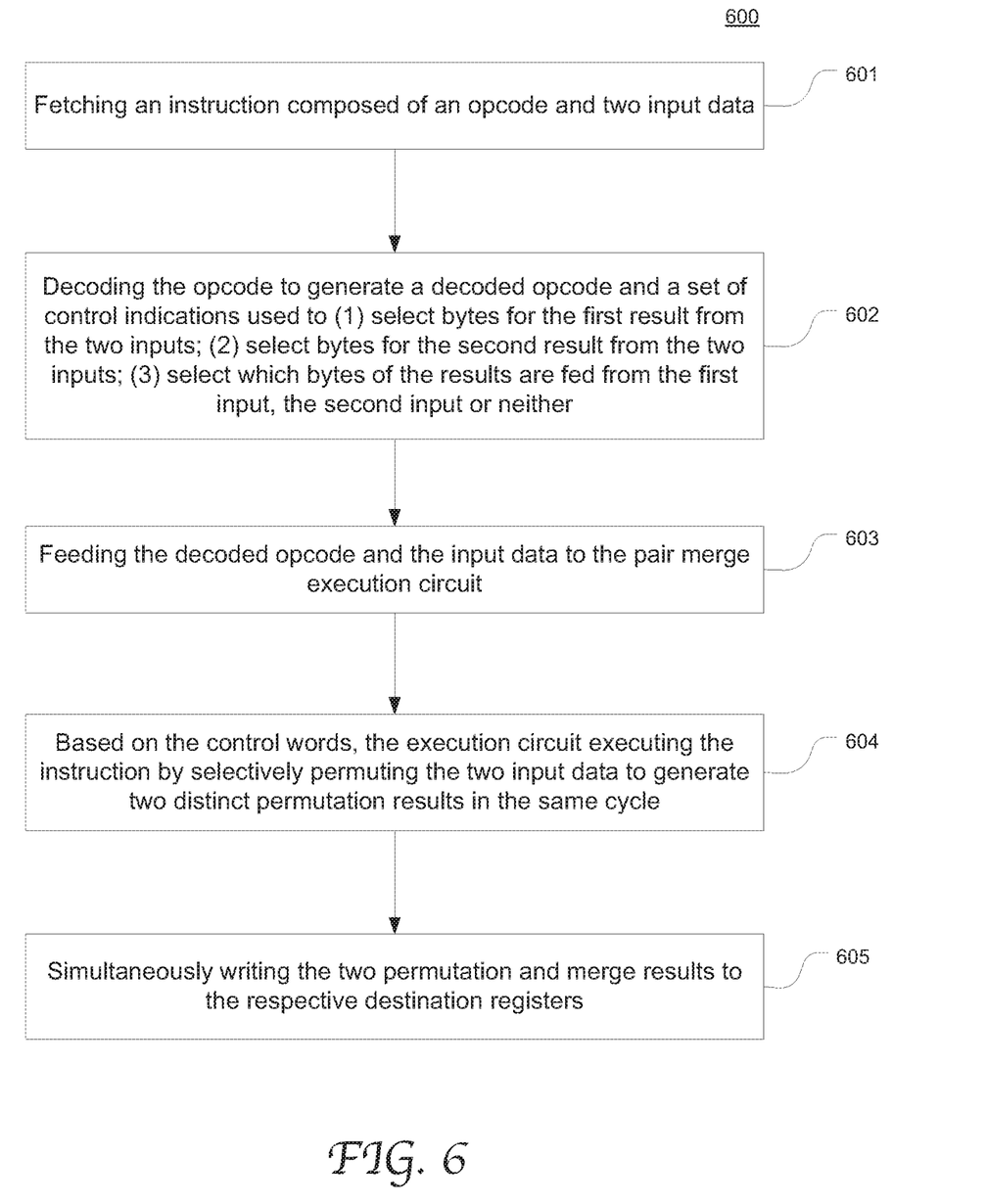
FIG. 6 is a flow chart depicting an exemplary process of executing an instruction that involves permutation of data bytes from two source operands to produce two permutation results at the same time in accordance with an embodiment of the present disclosure.

FIG. 6 is a flow chart depicting an exemplary process 600 of executing an instruction that involves permutation and merge of data bytes from two source operands to produce two permutation and merge results at the same time in accordance with an embodiment of the present disclosure. Process 600 can be performed by the components shown in FIG. 5 for example. At 601, an instruction is fetched which is composed of an opcode and the addresses of two input data. As noted above, the two input data may be two source operands or the two sections of a single source operand.

At 602, the opcode is decoded to generate a decoded opcode and a set of control indications used to select data bytes for each results. The control indications indicate (1) the byte positions selected from the two inputs for the first result; (2) the byte positions selected from the two inputs for the second result; and (3) which bytes of the results are fed from the first input, the second input or neither input.

At 603, the decoded opcode and the input data are fed to the pair merge execution circuit. At 604, based on the control words, the execution circuit executes the instruction by permuting the selected data elements from the two input data to generate two distinctive permutation and merge results in one execution cycle. At 604, the two permutation and merge results are simultaneously written to the respective destination registers.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method of executing instructions in a processor, said method comprising:
fetching an instruction comprising an opcode and a plurality of source operands, wherein each source operand of said plurality of source operands comprises a plurality of data units;
decoding said opcode to generate a plurality of control signals, wherein said plurality of control signals comprises a first signal, a second signal, and a third signal, wherein said first signal comprises a plurality of first values in respective first positions, wherein each value of said plurality of first values indicates a position in said each source operand of said plurality of source operands, wherein said second signal comprises a plurality of second values in respective second positions, wherein each value of said plurality of second values indicates a position in said each source operand of said plurality of source operands, wherein said third signal comprises a plurality of third values in respective third positions, wherein a first plurality of said third positions corresponds to said first positions and a second plurality of said third positions corresponds to said second positions, and wherein each value of said plurality of third values indicates a respective source operand of said plurality of source operands;
sending said plurality of control signals and said plurality of data units to an execution circuit; and controlling said execution circuit with said plurality of control signals to:
for each of said first plurality of third positions, use the third value in the respective third position to select said respective source operand of said plurality of source operands and use the first value in the first position corresponding to said respective third position to select a first data unit from the selected respective source operand for a first permutation result; and
for each of said second plurality of third positions, use the third value in the respective third position to select said respective source operand of said plurality of source operands and use the second value in the second position corresponding to said respective third position to select a second data unit from the selected respective source operand for a second permutation result.

2. The method of claim 1, wherein said plurality of source operands comprises a first source operand and a second source operand, wherein each source operand of said first and second source operands comprises at least two data units, and wherein said first permutation result and said second permutation result each comprises data units selected from both of said first and second source operands.

3. The method of claim 1, wherein said plurality of source operands comprises a source operand divided into a set of upper bytes and a set of lower bytes, and wherein said first permutation result and said second permutation result each comprises data bytes selected from said set of upper bytes and said set of lower bytes.

4. The method of claim 1, wherein said instruction is one of a load instruction, a store instruction, a floating point vector instruction, a single-instruction-multiple-data (SIMD) across-vector instruction, and an SIMD permute instruction.

5. The method of claim 1, wherein said plurality of control signals is further based on at least one of: a size of vector elements, and a length of said each permutation result.

6. The method of claim 1, wherein each data unit in said plurality of source operands is associated with a respective control value of a plurality of control values;
wherein if said respective third position is one of said first plurality of third positions, then said first data unit is selected from said selected respective source operand for said first permutation result by matching the control value associated with said first data unit and said first value in said first position; and
wherein if said respective third position is one of said second plurality of third positions, then said second data unit is selected from said selected respective source operand for said second permutation result by matching the control value associated with said second data unit and said second value in said second position.

7. The method of claim 1, wherein said each value of said plurality of first values also corresponds to a respective location in a first destination register of a plurality of destination registers, and wherein said each value of said plurality of second values also corresponds to a respective location in a second destination register of said plurality of destination registers.

8. The method of claim 1, wherein data units of said each permutation result are arranged in an order according to respective orders of said first, second, and third values in said first, second, and third signals.

9. The method of claim 1, further comprising writing said each permutation result of said plurality of permutation results to a respective destination register of a plurality of destination registers.

10. A processor configured to execute instructions and fetch an instruction comprising an opcode, said processor comprising:
one or more first registers configured to store a plurality of source operands of said instruction, wherein each source operand of said plurality of source operands comprises a plurality of data units;
a decoder coupled to said one or more first registers, and configured to decode said opcode to generate a plurality of control signals, wherein said plurality of control signals comprises a first signal, a second signal, and a third signal, wherein said first signal comprises a plurality of first values in respective first positions, wherein each value of said plurality of first values indicates a position in said each source operand of said plurality of source operands, wherein said second signal comprises a plurality of second values in respective second positions, wherein each value of said plurality of second values indicates a position in said each source operand of said plurality of source operands, wherein said third signal comprises a plurality of third values in respective third positions, wherein a first plurality of said third positions corresponds to said first positions and a second plurality of said third positions corresponds to said second positions, and wherein each value of said plurality of third values indicates a respective source operand of said plurality of source operands; and
an execution circuit coupled to said decoder and configured to:
for each of said first plurality of third positions, use the third value in the respective third position to select said respective source operand of said plurality of source operands and use the first value in the first position corresponding to said respective third position to select a first data unit from the selected respective source operand for a first permutation result; and
for each of said second plurality of third positions, use the third value in the respective third position to select said respective source operand of said plurality of source operands and use the second value in the second position corresponding to said respective third position to select a second data unit from the selected respective source operand for a second permutation result.

11. The processor of claim 10, wherein said plurality of source operands comprises a first source operand and a second source operand, wherein each source operand of said first and second source operands comprises at least two data units, and wherein said first permutation result and said second permutation result each comprises data units selected from both of said first and second source operands.

12. The processor of claim 10, wherein said plurality of source operands comprises a source operand divided into a set of upper bytes and a set of lower bytes, and wherein said first permutation result and said second permutation result each comprises data bytes selected from said set of upper bytes and said set of lower bytes.

13. The processor of claim 10, wherein said instruction is one of a load instruction, a store instruction, a floating point vector instruction, a single-instruction-multiple-data (SIMD) across-vector instruction, and an SIMD permute instruction.

14. The processor of claim 10, wherein said execution circuit comprises: a plurality of multiplexers; and a permutation switching fabric.

15. The processor of claim 10, wherein said plurality of control signals is further based on at least one of: a size of vector elements, and a length of said each permutation result.

16. The processor of claim 10, further comprising a plurality of second registers, wherein said execution unit is further configured to write said each permutation result of said plurality of permutation results to a respective second register of said plurality of second registers.

17. The processor of claim 10, wherein each data unit in said plurality of source operands is associated with a respective control value of a plurality of control values;
wherein if said respective third position is one of said first plurality of third positions, then said first data unit is selected from said selected respective source operand for said first permutation result by matching the control value associated with said first data unit and said first value in said first position; and
wherein if said respective third position is one of said second plurality of third positions, then said second data unit is selected from said selected respective source operand for said second permutation result by matching the control value associated with said second data unit and said second value in said second position.

18. A system comprising:
a memory; and
a processor coupled to said memory and configured to fetch an instruction comprising an opcode from said memory, said processor comprising:
one or more first registers configured to store a plurality of source operands of said instruction, wherein each source operand of said plurality of source operands comprises a plurality of data units;
a decoder configured to decode said opcode to generate a plurality of control signals, wherein said plurality of control signals comprises a first signal, a second signal, and a third signal, wherein said first signal comprises a plurality of first values in respective first positions, wherein each value of said plurality of first values indicates a position in said each source operand of said plurality of source operands, wherein said second signal comprises a plurality of second values in respective second positions, wherein each value of said plurality of second values indicates a position in said each source operand of said plurality of source operands, wherein said third signal comprises a plurality of third values in respective third positions, wherein a first plurality of said third positions corresponds to said first positions and a second plurality of said third positions corresponds to said second positions, and wherein each value of said plurality of third values indicates a respective source operand of said plurality of source operands; and
an execution circuit comprising a pair merge unit and configured to:
for each of said first plurality of third positions, use the third value in the respective third position to select said respective source operand of said plurality of source operands and use the first value in the first position corresponding to said respective third position to select a first data unit from the selected respective source operand for a first permutation result; and
for each of said second plurality of third positions, use the third value in the respective third position to select said respective source operand of said plurality of source operands and use the second value in the second position corresponding to said respective third position to select a second data unit from the selected respective source operand for a second permutation result.

19. The system of claim 18, wherein said plurality of source operands comprises a first source operand and a second source operand, wherein each source operand of said first and second source operands comprises at least two data units, and wherein said first permutation result and said second permutation result each comprises data units selected from both of said first and second source operands.

20. The system of claim 18, wherein said plurality of source operands comprises a source operand divided into a set of upper bytes and a set of lower bytes, and wherein said first permutation result and said second permutation result each comprises data bytes selected from said set of upper bytes and said set of lower bytes.

21. The system of claim 18, wherein said execution circuit comprises: a plurality of multiplexers; and a permutation switching fabric.

22. The system of claim 18, wherein said plurality of control signals is further based on at least one of: a size of vector elements, and a length of said each permutation result.

23. The system of claim 18, further comprising a plurality of second registers, wherein said execution unit is further configured to write said each permutation result of said plurality of permutation results to a respective second register of said plurality of second registers.

24. The system of claim 18, wherein each data unit in said plurality of source operands is associated with a respective control value of a plurality of control values;
wherein if said respective third position is one of said first plurality of third positions, then said first data unit is selected from said selected respective source operand for said first permutation result by matching the control value associated with said first data unit and said first value in said first position; and
wherein if said respective third position is one of said second plurality of third positions, then said second data unit is selected from said selected respective source operand for said second permutation result by matching the control value associated with said second data unit and said second value in said second position.

* * * * *